US006765689B1

(12) United States Patent  (10) Patent No.: US 6,765,689 B1
Benstein  (45) Date of Patent: Jul. 20, 2004

(54) METHOD AND SYSTEM FOR PREPARING PRINTED MATTER

(75) Inventor: Thomas A. Benstein, Boca Raton, FL (US)

(73) Assignee: LojX, Inc., Boca Raton, FL (US)

( * ) Notice: Subject to any disclaimer, the term of this patent is extended or adjusted under 35 U.S.C. 154(b) by 0 days.

(21) Appl. No.: 09/526,010

(22) Filed: Mar. 15, 2000

(51) Int. Cl.$^7$ .............................................. G06F 15/00
(52) U.S. Cl. ........................ 358/1.18; 358/1.15; 707/9; 715/517
(58) Field of Search ............................... 358/1.12, 1.13, 358/1.14, 1.15, 1.16, 1.17, 1.18; 707/505, 506, 513, 514, 517, 9, 100; 715/519

(56) References Cited

U.S. PATENT DOCUMENTS

| | | | | |
|---|---|---|---|---|
| 5,872,640 | A | * | 2/1999 | Cohen et al. ............... 358/434 |
| 5,930,810 | A | * | 7/1999 | Farros et al. ............... 707/506 |
| 6,012,070 | A | * | 1/2000 | Cheng et al. ............... 707/505 |
| 6,205,452 | B1 | | 3/2001 | Warmus et al. |
| 6,222,947 | B1 | | 4/2001 | Koba |
| 6,233,592 | B1 | | 5/2001 | Schnelle et al. |
| 6,353,483 | B1 | | 3/2002 | Laverty et al. |
| 6,362,895 | B1 | | 3/2002 | Laverty et al. |
| 6,381,032 | B1 | | 4/2002 | Laverty et al. |
| 6,396,593 | B1 | | 5/2002 | Laverty et al. |
| 6,429,947 | B1 | | 8/2002 | Laverty et al. |
| 6,473,760 | B1 | * | 10/2002 | Klatt et al. .................... 707/10 |

OTHER PUBLICATIONS

BBrilliant.com, The Personalization Center http://www.careercards.com/IBC/aboutb2business.html.
Custom Online Printing: Custom Printing Online www . . . /select_orientation.cgi?customer_id=33161COL00&account_number=17087&session_id=98373481720eHHAj4ReFr3/4/01.
Businesscards.com http://www.businesscards.com/cgi-bin/cgiwrap/cards/start.cgi/businesscard/enter.html.
Hawthorne Publishing!! http://www.hawthorne-pub.com/.
iGetSmart.com—Online Graphic & Fulfillment Solutions http://www.igetsmart.com/demo1_pg 1.html.
ImageX.com, How It Works: http://www.imagex.com/capabilities/howitworks.asp.
iPrint.com, Pick a Business Card Type http://www111.iprint.com/cgi-sh1/index.cgi?sID=2001030411/b20291c16ce39b76-2&level=1060.
Nexpub: http://www.printonthenet.com/.
V&V International Corp.: http://www.colorbc.com.

\* cited by examiner

Primary Examiner—Mark Wallerson
(74) Attorney, Agent, or Firm—Stroock & Stroock & Lavan LLP

(57) ABSTRACT

A method and system are provided for preparing printed matter. The method is particularly well-suited for the Internet. Herein, an account holder provides information related to a desired type of printed matter to a printer. The printer collects data from a user to complete a template, and from the completed template, a viewable proof of the printed matter is instantaneously provided to the user. If the viewable proof is approved by the user, the printed matter is ordered to be printed. If not approved, the user makes changes to the data provided to instantaneously generate a new viewable proof. The process is repeated until the printed matter is ordered to be printed.

12 Claims, 7 Drawing Sheets

METHOD AND SYSTEM FOR PREPARING PRINTED MATTER

CROSS-REFERENCE TO RELATED APPLICATIONS

BACKGROUND OF THE INVENTION

1. Field of the Invention

This invention relates to methods for preparing printed matter, and, more particularly to methods for preparing printed matter over the Internet.

2. Description of the Prior Art

In the prior art, personalized printed matter is obtained through an extended process of back-and-forth between a printer and an end user. This process is even more extensive when dealing with a large company having several to many facilities. In such organizations, there is commonly an individual or department assigned with the responsibility of procuring personalized business stationery (letterheads, note pads, etc.), business cards, and other personalized printed business-related matter, such as identification badges, passes, vouchers, etc. With reference to FIG. 1, as shown in Box 1, an end user (such as a new employee) who desires a printed product (specified by way of non-limiting example as a business card) fills out a paper order form with required information, and the paper order form is transmitted to the procurement individual/department (referred to as "central office") by facsimile, inter-office mail, etc., as represented by Box 2. The procurement individual/department reviews the paper order form to ensure its completeness, and forwards the form to a contracted printer.

With reference to Box 3, in a common prior art arrangement, the printer manually typesets the information on the forwarded form using a page layout program, such the program sold under the mark "QuarkXPress" by Quark, Inc., and creates hard copy proofs of the desired printed matter. The proofs are then forwarded to the procurement individual/department (Box 4). The proofs may be reviewed by the procurement. individual/department, but are also often forwarded to the end user for review. If any corrections are required, such as to correct misspellings, typographical errors, and the like, the proofs are annotated accordingly, and the annotated proofs are forwarded to the procurement individual/department to repeat the process of Boxes 2–5. The sub-process of Boxes 2–5 is continuously repeated until the proofs are correct and approved.

As noted at Box 6, once the proofs are approved, the procurement individual/department notifies the printer, or forwards a copy of the approved order. Since the corrections to the proofs must be made in the page layout program, the files stored in the program should contain correct information, upon approval of the proofs. Printing plates are generated from the page layout program using techniques known in the prior art (Box 7), and the desired printed matter is printed using the printing plates (Box 8). Finally, the printed matter is forwarded to the end user (Box 9), often through the procurement individual/department.

As is readily apparent, the prior art method has several shortcomings. For instance, the repetitive process necessary to correct errors in the proofs (sub-process represented by Boxes 2–5) is often time-consuming and may take several days to weeks. Generally, three weeks are required to perform the entire process of FIG. 1. Additionally, the process necessary to correct errors relies on manual input, which is not fully accurate. Thus, all requested corrections may not be entered into a proof, necessitating further corrections and generation of proofs.

Furthermore, consistency in printed matter throughout an organization may not be obtained. For example, a business card of a first employee of an organization may include the full spelling of "Street", whereas, a second employee of the same organization may include the abbreviation "St.". Organization-wide consistency is often preferred in personalized printed matter to provide a more professional image of the organization. These problems are exasperated where national franchises are involved and each individual franchisee of a national franchiser prints printed matter. Often, the national franchiser wants control over the presentation of business cards, letterheads, etc. to ensure a desired image of the company is being maintained.

It is an object of the subject application to provide a method for preparing printed matter which overcomes the shortcomings of the prior art.

It is also an object of the subject invention to provide a method for preparing printed matter that may be used over the Internet.

SUMMARY OF THE INVENTION

The aforementioned objects are met by a method for preparing personalized printed matter which is well-suited for the Internet. The method can be used to produce personalized printed matter, including, but not limited to, business cards, letterheads, envelopes, note pads, identification badges, and vouchers.

In a first embodiment of the method, an account holder, such as a company, establishes an account and provides information for creating one or more templates. A template is created for each type of printed matter that the account holder desires to have printed. Thus, for a company desiring personalized business cards, letterheads and note pads, three templates would be required. Each template sets forth the layout of the printed matter (location of business name, logo, employee's name on printed matter, etc.) as well as the desired type(s) (e.g. type of font, font size). Further, each template includes fixed information set forth by the account holder and data fields. The fixed information can only be altered by the account holder, whereas, the data fields require information to be inputted. With the templates having been created, a data collection template is generated which contains input fields corresponding to all of the data fields located in the templates, without duplication. For example, where all three templates require the first name and last name of an employee and the template for the letterhead has a data field for a user's email address, the resulting data collection template contains single input fields for the first name, last name and e-mail address of the user. Once generated, access to the data collection template is granted to a user who requires personalized printed matter (typically an employee of the account holder). The user enters personal information required in the input fields, and the collected information is entered into the corresponding data fields of the templates. Preferably, the account holder is allowed to specify formatting parameters of the user information when entered in the data fields of the templates. In this manner, an account holder can ensure consistency in generated personalized printed matter. Moreover, this consistency is achieved without requiring independent reviews of the printed matter of the various users.

The inputted information is merged with the data of the templates to form completed templates. Preferably, the user is instantaneously provided a viewable proof based on the completed template. If verified, the user approves and an order is placed. The completed templates are used to generate printing plates, to be used for printing using techniques known by those skilled in the art, and/or to transmit data to a digital printing system. The printed matter is then printed and forwarded to the user in accordance with the order.

In a second embodiment of the invention, the account holder and the user are a single entity. Here, an entity personally selects the layout and the type of a desired type of printed matter, and a template is generated. Preferably, a viewable proof is instantaneously formed for review, and, upon approval of the viewable proof, the printed matter is produced. The template here only contains fixed information provided by the entity, and data fields are not necessary. The template may be such that personal information is not required (e.g. a letterhead only containing a logo), or, alternatively, the template may include information personal to the entity which does not require further inputting (e.g. a general corporate letterhead; a sole proprietorship's letterhead). To facilitate future changes—not necessarily corrections, but changes to name, marital status, address—and/or re-orders, the template is saved. The template is used to produce the printed matter using techniques known to those skilled in the art.

Both the first and second embodiments are well-suited for use over the Internet. With both embodiments, templates can be created and instantly verified by an account holder prior to transmitting the template over the Internet for access by the printer. Additionally, a user of the first embodiment can access the data collection template over the Internet and enter information into the data collection template from a computer terminal remote from the account holder's computer terminal and/or the printer's terminal. The user is also able to verify the information prior to transmission. The method of the subject invention advantageously eliminates the back-and-forth process of the prior art. It is to be understood that the methods described herein are not limited to use over the Internet and can be used over any computer network.

The inventions described herein will be better understood through a study of the following detailed description and accompanying drawings.

DETAILED DESCRIPTION OF THE PREFERRED EMBODIMENTS

Referring generally to the FIGS., a method and system is described herein for producing personalized printed matter. The method is particularly well-suited for practicing over the Internet.

Figure 1:
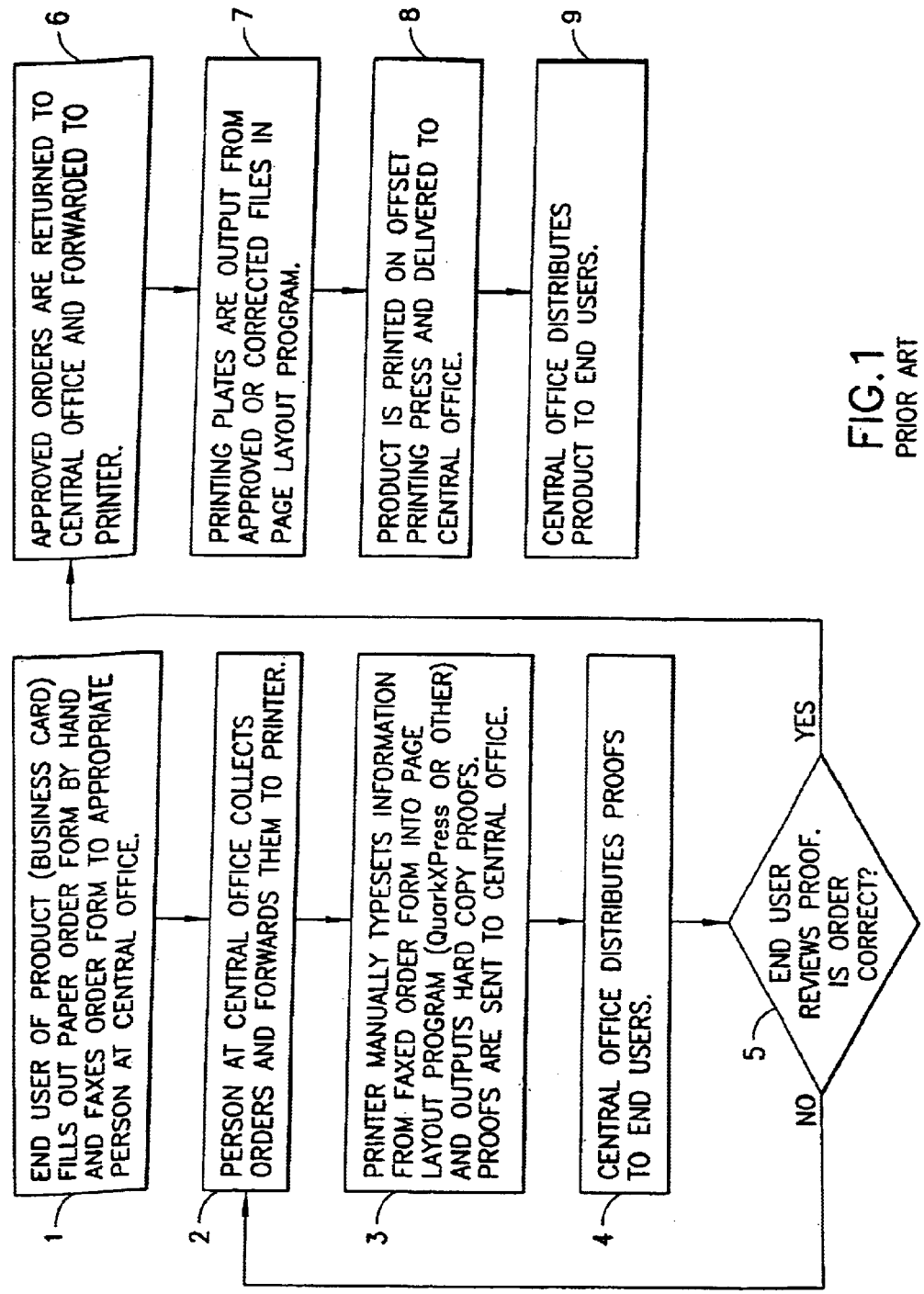
FIG. 1 is a flow chart of a prior art method for preparing printed matter.
Figure 2:
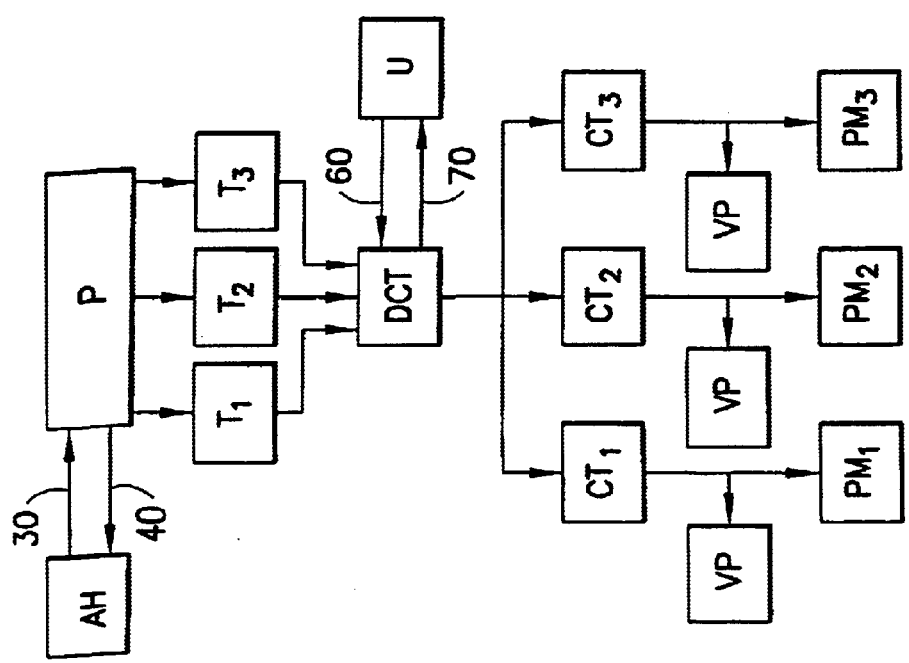
FIG. 2 is a diagram representing the first embodiment of the invention.

With reference to FIG. 2, in a first embodiment of the invention, an account holder AH interacts with a printer P to form template(s) T1, T2, T3 which correspond to each type of printed matter desired to be printed by the account holder AH. Thus, by way of non-limiting example, where the account holder AH desires to have personalized business cards, note pads, and letterhead printed, three templates would be required. As is clearly apparent, any number of templates can be created in accordance with the invention herein fit to the account holder's requirements.

Reference to an account holder AH is to a person, organization, business, or other entity. To accomplish the method herein, an individual or individuals (such as a procurement individual or department) will have to act on behalf of the account holder AH, where the account holder AH is not an individual. Different individuals may act at different times on behalf of the account holder AH. Thus, references to an account holder AH taking action is to the account holder AH himself or to a representative of the account holder AH. The same applies to references of the printer P. Others may also act on behalf of an individual account holder AH.

Figure 3B:
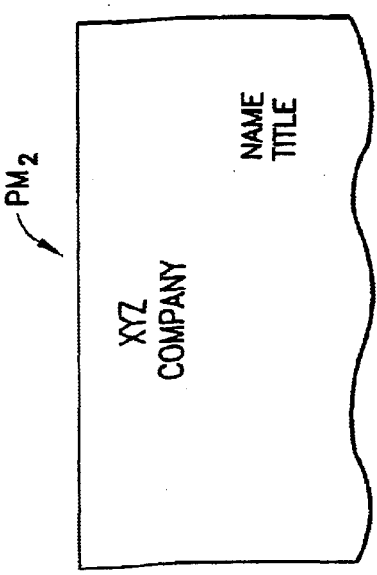
FIGS. 3(a) and 3(b) are schematics of types of printed matter.
Figure 3A:
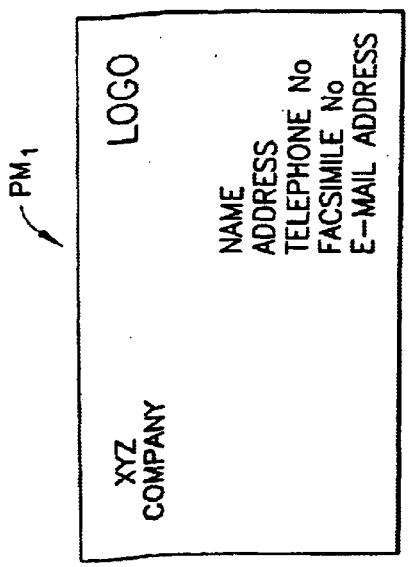

The templates T1–T3 include basic layout and type information of the respective printed matter. As shown in FIG. 3(a), printed matter PM1, a business card, includes an arrangement of various items, such as company name, logo, employee information, (this information being considered herein as "layout" information), with each item having graphical considerations of both style (ink color, font type, font style (e.g., bold, italics, underline)) and font size (this information being collectively considered herein as "type" information). The same considerations apply to printed matter PM2, a letterhead, shown in FIG. 3(b).

The templates T1, T2, T3 can be created by computer, or through traditional layout methods, including on paper. The reference herein to the templates T1, T2, T3 is to a compilation of data that specifically defines the information discussed herein where the information need not be graphically depicted. Thus, the templates T1, T2, T3 need not be in the form shown in FIGS. 3(a) and 3(b); for example, the templates T1, T2, T3 may be lists of layout and type information, not presented in actual graphic form.

Figure 4B:
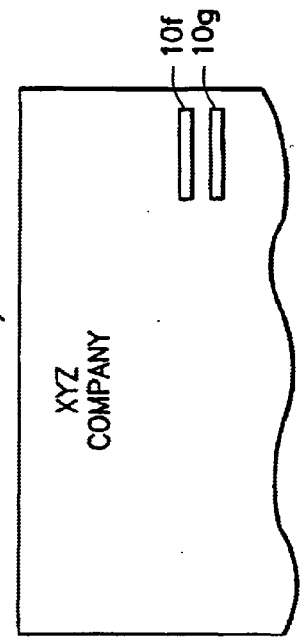
FIGS. 4(a) and 4(b) are graphical depictions of templates.
Figure 4A:
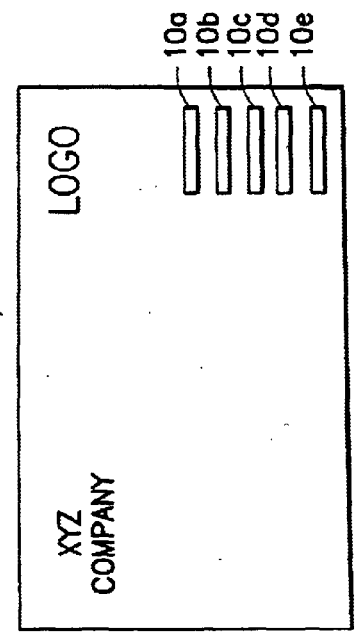
Figure 5:
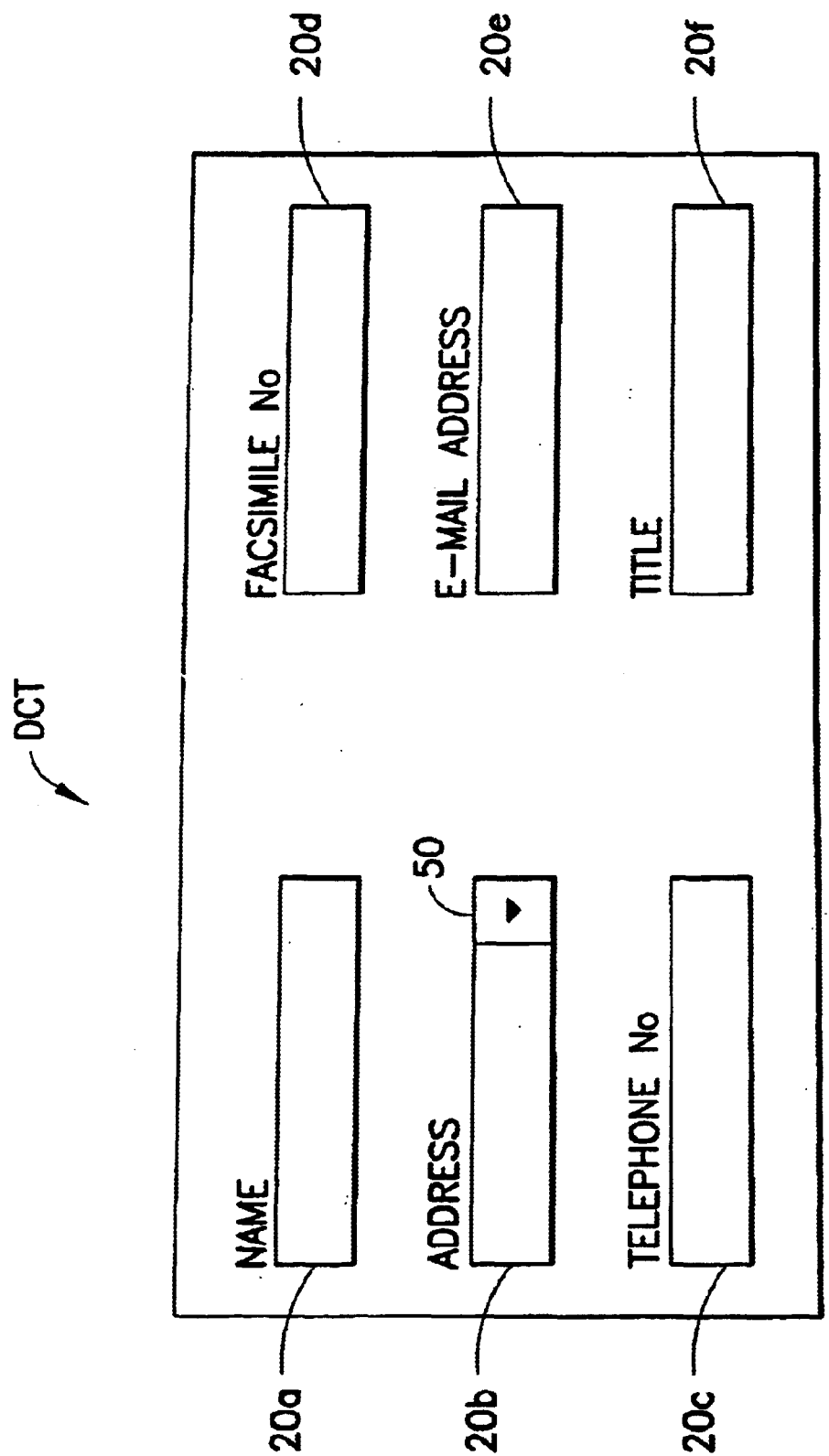
FIG. 5 is a schematic of a data collection template.

Besides the layout and type information, the account holder AH can specify personal data that is to be entered in the form of data fields. Again, referring to FIG. 3(a), the name, address, telephone number, facsimile number, and e-mail address may be bits of personal information that are collected in preparing printed matter PM1. The specific bits of information are preferably specified by the account holder AH for each type of printed matter. Thus, the account holder AH can indicate that the name and title of an employee will appear on printed matter PM2, while the name, address, telephone number, facsimile number, and e-mail address of the employee will appear on printed matter PM1. Accordingly, as shown schematically in FIGS. 4(a) and 4(b), the template T1 is formed with data fields 10(a)–(e) corresponding to the five bits of personal information specified by the account holder AH, and, the template T2 is formed with data fields 10(f)–(g) corresponding to the two bits of personal information specified by the account holder AH. The number of data fields, for each of the templates T1, T2, corresponds to the required number of bits of personal information. It should be noted that some of the data fields may be duplicative, such as data fields 10(a) and 10(f) which are both directed to the name of an employee.

The locations of the data fields 10(a)–(g) and the eventual presentation of the personal data that is to be entered therein (i.e., layout and type information) are specified by the account holder AH in forming the templates T1–T3. As an additional feature, the account holder AH can enter formatting parameters for the personal data. Thus, the account holder AH can specify that the term street will appear as the abbreviation "St." in printed matter, regardless of the form (e.g., "Str.", "Street") the term is inputted, as described below. Also, the formatting parameters can specify the format of a person's title (Mr.; Ms.; Mrs.); a person's qualifications (Esq.; Ph. D.); geographical names (spelling out the full name of a state versus postal abbreviation); and so forth.

As indicated in FIG. 2 by arrows 30 and 40, the templates T1–T3 are generated through an interactive process between the account holder AH and the printer P. As described more fully below, this interactive process may be conducted over the Internet, or through other modes of communication. The templates T1–T3 are complete when approved by the account holder AH. Once completed, the templates T1–T3 are stored and preferably made accessible to the account holder AH to allow for future editing.

A data collection template DCT is preferably prepared based on the templates T1–T3. The data collection template DCT includes input fields 20(a)–(f) that correspond to the data fields 10(a)–(g) specified by the account holder AH. However, there is no repetition of any of the input fields 20(a)–(f). Returning to the example given above, the data collection template DCT is generated with input fields 20(a)–(f) for collecting an employee's name (20(a)), address (20(b)), telephone number (20(c)), facsimile number (20(d)), e-mail address (20(e)), and title (20(f)). Input fields can correspond to one more data fields of one or more templates. As here, the input field 20(a) corresponds to both the data field 10(a) of the template T1 and the data field 10(f) of the template T2.

The data collection template DCT is used for data collection and any form in which the required data can be collected in the input fields 20(a)–(f) is acceptable. Preferably, the data collection template DCT is made available through an interface over the Internet, with the data collection template DCT being prepared with HTML programming or other Internet-based programming. Different forms of the data collection template DCT are acceptable; for example, all of the input fields need not appear on one page (either on a computer or on paper). The reference to data collection template DCT is to a data collection vehicle, not limited to a specific form.

Referring again to FIG. 2, the data collection template DCT is made accessible to a user U. It is foreseen that the typical user will be an employee of the account holder AH (thus, the prior references to employee information). However, access to the data collection template DCT is given to any user for whom the account holder AH would like printed matter prepared. For example, the account holder AH may be administering a trade show or other event and intends to print personalized identification badges, personalized brochures, vouchers for food or lodging, etc. It is to be understood that references herein to employees of the account holder is to illustrate the invention, and it is not intended to limit it thereto.

With access to the data collection template DCT, the user U inputs the required information into the appropriate input field 20(a)–20(f). To facilitate data inputting, data previously inputted by the account holder AH may be made available to the user U, such as through a computer pull-down menu 50 or other link known to those skilled in the art. The previously inputted information may include addresses of the facilities of the account holder AH, telephone numbers, facsimile numbers, and so on. By previously inputting the information, the risk of data entry errors is reduced. In addition, the desired formatting specified by the formatting parameters is used to alter the inputted information into the desired forms.

As represented in FIG. 2 by arrows 60 and 70, the user U interactively inputs the data into the data collection template DCT. When the user U verifies the inputted data, the data collection template DCT is approved.

The information inputted into the data collection template DCT is then merged with the templates T1–T3 to form completed templates CT1, CT2, CT3. Stated simplistically, the information from the input fields 20(a)–(f) is inserted into the data fields 10(a)–(g). The information from the data collection template DCT is merged with the templates T1–T3 in accordance with any formatting parameters specified by the account holder AH. The completed templates CT1, CT2, CT3 correspond to the templates T1–T3. As with the templates T1, T2, T3, the completed templates CT1, CT2, CT3 are respectively compilations of data wherein the data need not be graphically depicted. The completed templates CT1, CT2, CT3 must contain sufficient data to enable printing, as described below, and preferably to prepare a viewable proof, also described below.

Figure 7:
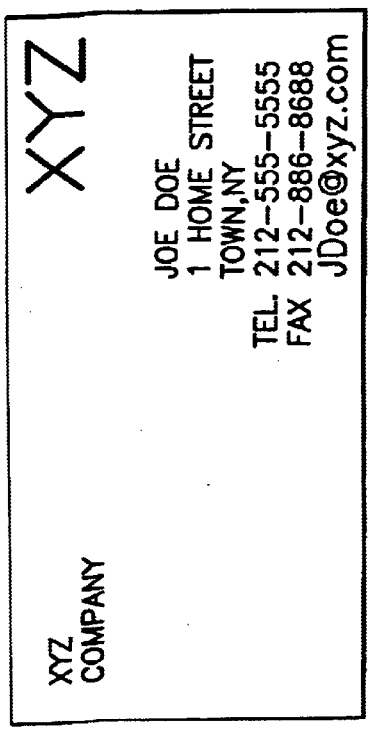
FIG. 7 is a flow chart representing an exemplary process in accordance with the subject invention.

It is preferred that viewable proofs VP, such as that shown in FIG. 7, resembling each of the desired printed matters be provided to the user U, preferably instantaneously, based on the respective completed template CT1, CT2, CT3. As used herein, instantaneous preparation of viewable proofs refers to the viewable proofs being immediately prepared and transmitted upon completion of the templates; the immediate preparation and transmission takes into account delays caused by hardware processing, data transmission and communication links. The viewable proofs VP are generated preferably using known graphics technology including programming compatible with Adobe .PDF format, XML format, and others. The user U approves the viewable proof VP to place an order or requests a change and returns to the data collection template DCT. Upon receipt of approval of the viewable proof VP, a confirmatory e-mail or message may be forwarded to the user U, which preferably includes an order number identifying the order.

The specifics of an order (i.e., the type of printed matter, the quantity of each type of printed matter) for a particular user U may be determined by the account holder AH and/or the user U. Access to the data collection template DCT may be limited by password, which is associated with an order's characteristics being entirely specified by the account holder AH. Using techniques known in the prior art, the order characteristics are associated to a password. Alternatively, the account holder AH may specify some of the order characteristics, such as, the types of printed matter which the user U may order, with the user U specifying the remainder of the order characteristics, such as the quantity of the printed matter to be received. Furthermore, the user U may freely dictate the specifics of the order.

The completed templates CT1, CT2, CT3 are used to prepare the printed matter PM1–PM3. In one method, the completed templates CT1, CT2, CT3 are used to generate printing plates. Preferably, data is lifted from the completed templates CT1, CT2, CT3 and used in known page layout programs to form the printing plates. The printing plates are then used for printing. Alternatively, the data may be transmitted from the completed templates CT1, CT2, CT3 directly to digital printers, known in the prior art, for printing. The printed matter, PM1–PM3, produced in accordance with the order characteristics, is forwarded to the user U.

Figure 8:
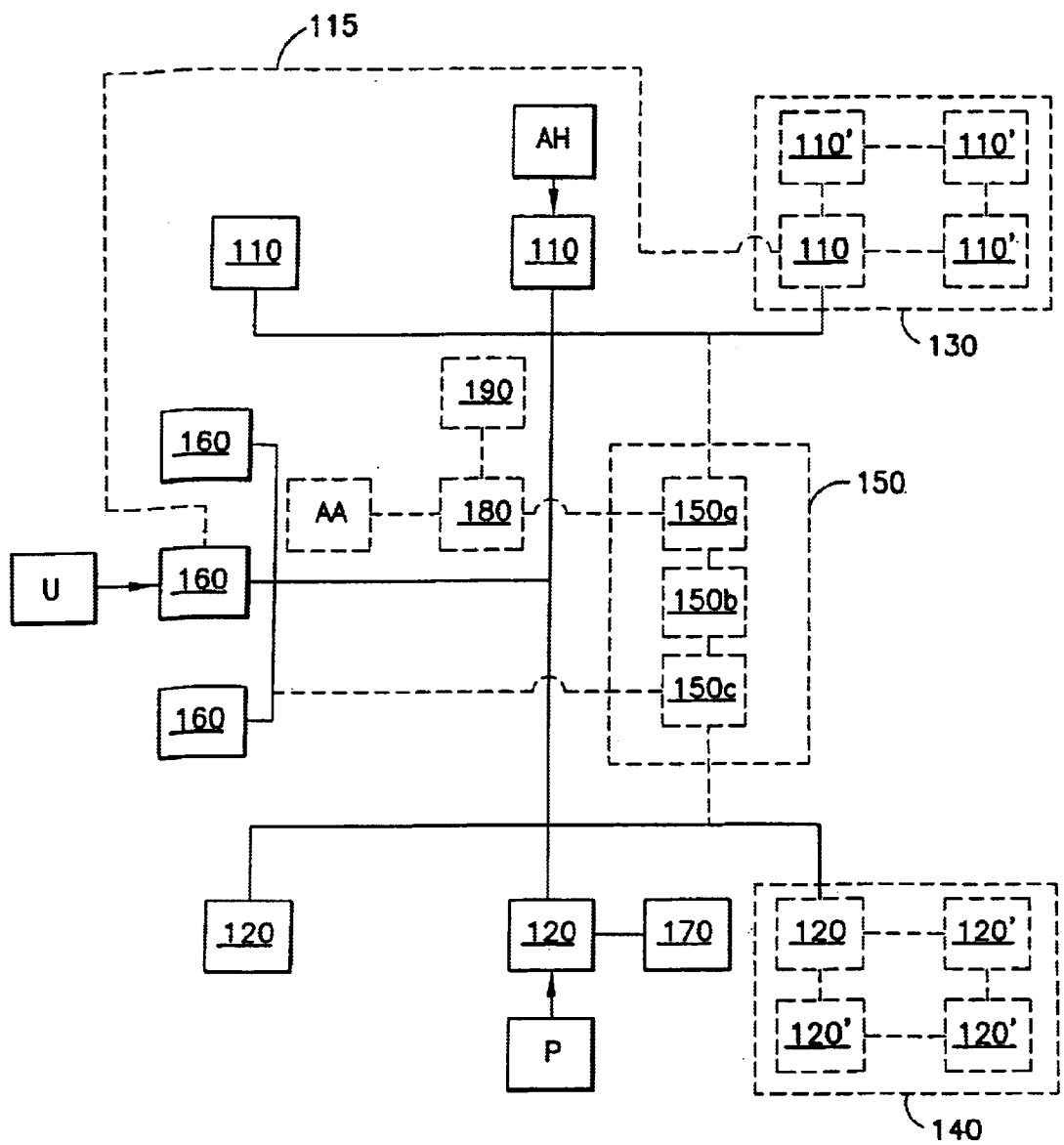
FIG. 8 is a schematic of a system usable with the invention.

As stated above, the method of the subject invention is well-suited for use over computer networks, including intranets and the Internet. As shown in FIG. 8, the method can be practiced over a system 100, which includes at least one input terminal 110, and at least one output terminal 120. Each of the input terminals 110 is preferably a CPU which may be a stand-alone computer, or part of an intranet 130 with other linked terminals 110. Likewise, each of the output terminals 120 is preferably a CPU which may be a stand-alone computer, or part of an intranet 140 with other linked terminals 120.

The system 100 requires at least one input terminal 110 and at least one output terminal 120 to function in accordance with the teachings herein. The input terminal 110 and the output terminal 120 may be connected through a hard-wire connection, direct modem connection, or through the Internet. Likewise, multiple input terminals 110 may be connected to a single output terminal 120 or to multiple output terminals 120. Data passing between the input terminal 110 and the output terminal 120 may pass through various servers and/or computers. FIG. 7 shows schematically an indirect connection 150, such as that commonly found on the Internet, which may include multiple servers 150a, 150b, 150c. Additionally, the system 100 may include one or more user terminals 160 connected to the output terminal 120 and/or to the input terminal 110. Further, the user terminal 160 may be a part of the intranet 130 with the input terminal 110, as represented by a connection 115. The connections between the computers and servers are made using techniques known by those skilled in the art. It should also be noted that the reference to communicating and transmitting data herein between two terminals, servers, etc., entails not only instantaneous communication, but also delayed communication, where data is transmitted by one terminal and the data is temporarily stored on one or more servers before reaching the destination terminal (i.e., there may be a delay between the transmission of data by one terminal and receipt of the data by the destination terminal.)

Figure 6:
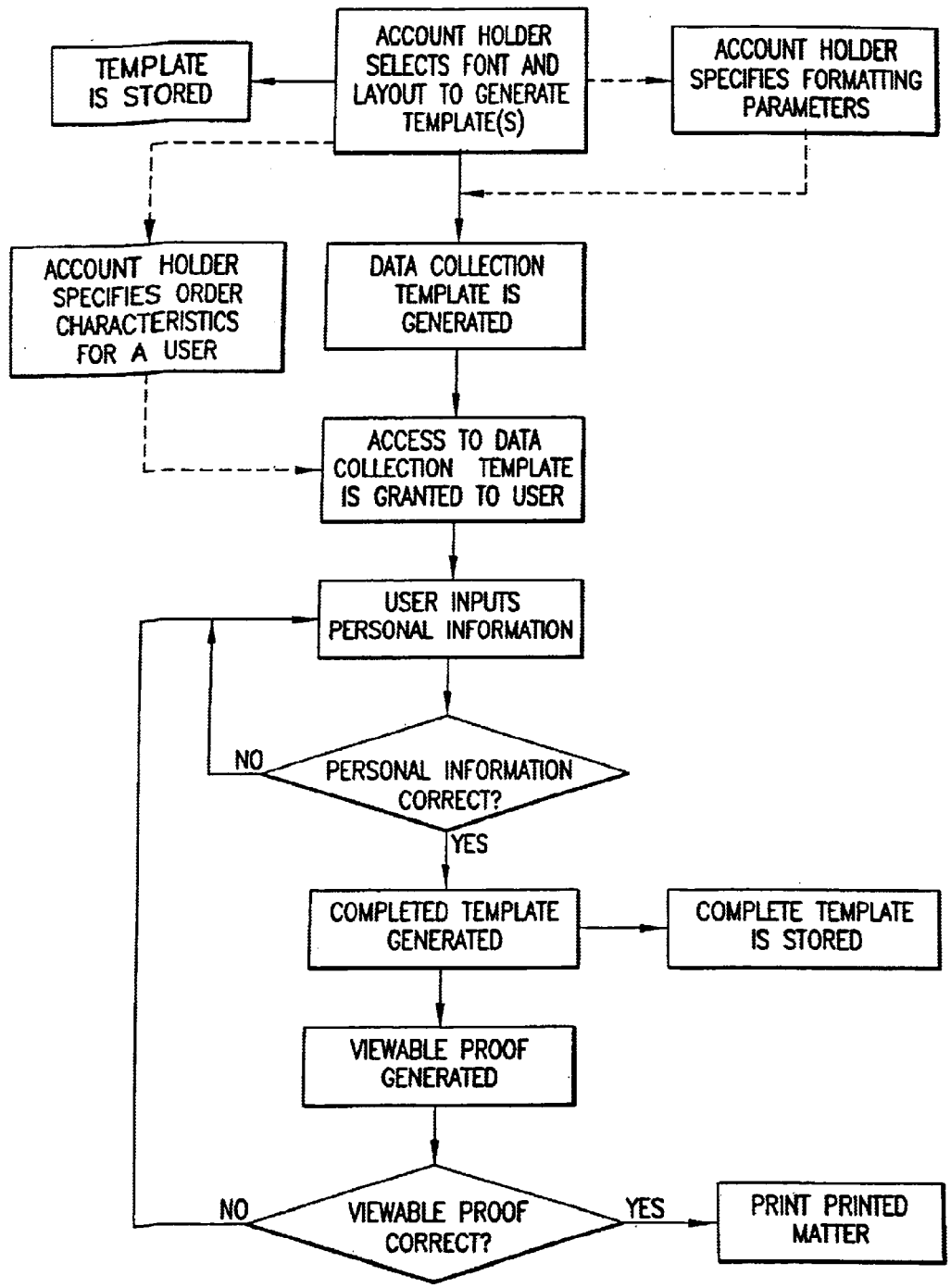
FIG. 6 is a schematic of a viewable proof of a business card.

To illustrate the subject invention, an exemplary practice of the invention is described and depicted in FIG. 6. The account holder AH opens an account with the printer P. To obtain accounts, the printer P can advertise the inventive method through traditional forms of advertisement, including print media, radio, television, and so on, and/or through maintaining a web site or page(s) on the Internet. The account holder AH can respond to such advertisement to open an account using traditional forms, such as through written correspondence, telephone, facsimile, and the like, through the sending of an e-mail message, or through transmitting information directly to a web page. The opening of an account relies on methods well known in the prior art.

Once an account is opened, the account holder AH provides information to the printer P as to which types of printed matter PM1, PM2, PM3 are desired. The printer P collects information from the account holder AH to formulate the templates T1, T2, T3. The templates T1, T2, T3 are made available to the account holder AH for verification with the printer P using the output terminal 120. Preferably, this is done over the Internet, with the account holder AH using the input terminal 110 to transmit corrections or changes also over the Internet. Once the account holder AH approves the templates T1, T2, T3, the templates are stored at the output terminal 120, or at a connected memory 170, which may be a separate CPU, separate storage on the output terminal 120, a server on the Internet, and so forth. Any formatting parameters desired by the account holder AH are associated with the templates T1, T2, T3 and also stored on the memory 170.

A data collection template DCT is formed from the information specified with respect to the templates T1, T2, T3, and stored in association with an identifier identifying the account holder AH. The data collection template DCT is preferably stored on the memory 170, but may also be stored anywhere in the system 100, so long as it is accessible to user U. The account holder AH provides the user U who requires printed matter access to the data collection template DCT. Access is preferably granted by providing a password, or other security measure known to those skilled in the art, including an unpublicized web address. The user U may also be given access through a hyperlink or other connection provided to the user U by the account holder AH at the user terminal 160. As is readily apparent, the use of any security measure must be coordinated between the account holder AH and the printer P. Order characteristics may be associated with the access mode, so that the act of accessing by the user U may automatically define the proper data collection template DCT to be used, and the quantity of the order. For example the password may specify the user to only obtain 1,000 business cards, thereby activating the associated template T1 and the data collection template DCT.

It is envisioned that a typical user U will use the user terminal 160, which may be remote from both the input terminal 110 and/or the output terminal 120. Under certain circumstances, the user U may use the input terminal 110, with the user terminal 160 being the same as the input terminal 110 (i.e., the user U is inputting data through the input terminal 110 where the account holder AH information had been inputted). Upon gaining access, the appropriate data collection template DCT is provided to the user U. The user U enters pertinent information. It should be noted that the account holder AH can give the user U control over the size of an order (e.g., the quantity of letterhead being ordered), the types of printed matter to be received, etc., and that order information would also be collected by the data collection template DCT.

In entering the pertinent data into the data collection template DCT, the user U has an opportunity to carefully verify the accuracy of the information. Once the template DCT is completed, and the user U is satisfied with its accuracy, the user U causes the completed data collection template DCT to be transmitted to the printer P. The data obtained by the data collection template DCT is preferably stored in the memory 170. The data is then merged with the associated template T1 to form the completed template CT1. Preferably, the viewable proof VP is then transmitted to the user U for verification and, more preferably, the viewable proof UP is instantaneously transmitted. If in order, the user U approves the viewable proof VP, and the order is placed in accordance with the order characteristics for the printed matter as represented by the viewable proof VP. Approval is transmitted to the printer P. If the viewable proof VP includes an error, the user U can return to the data collection template DCT and rectify the error. A new viewable proof VP can be created and reviewed, and the process repeated as needed. Using HTML programming and/or the Adobe .PDF format, and relying on e-mail technology, the process of proof review by the user U can be done extremely quickly. Once the order is placed, preferably, an acknowledgement message, by e-mail, is transmitted from the output terminal 120 acknowledging receipt of the completed data, with the message going to the user U and/or the account holder AH. An order number may also be given and transmitted with the confirmatory message.

The merger of each of the templates T1, T2, T3 and the data collection template DCT is preferably accomplished using "QuarkXPress", sold by Quark, Inc., and a program extension, preferably "XData", sold by EM Software, for customizing the data merger. Alternatively, the data can be merged in .PDF format using software sold by Adobe Systems, Inc.

Subsequently, using techniques known to those skilled in the art, printing plates may be formed from the completed templates CT1, CT2, CT3, using prior art devices such as an imagesetter or platesetter (e.g. Agfa Accuset), or the data may be transmitted to a digital printing system, such as Xerox Docutech. In either regard, printed matter is generated in accordance with the order characteristics and forwarded to the user U (the printed matter can be forwarded through the account holder AH to the user U). The account holder AH may be given access to review pending orders before fulfillment, to determine, if orders are to proceed.

The subject invention can be varied in many ways. For example, the account holder AH and/or the user U may not deal directly with the printer P, but rather with an account administrator AA, who acts as an intermediary between the account holder AH and/or the user U, and the printer P. In this manner, the account administrator AA may develop relationships with multiple printers, and theoretically obtain better pricing. Referring to FIG. 8, the account administrator AA preferably has an administration terminal 180 which is connected to the system 100 in accordance with the discussion provided above. The account terminal 180 will generally be located remotely from the input terminal 110, the output terminal 120, and the user terminal 160. The account administration AA accomplishes any given number of the steps described above. For example, the account administrator AA may initially interact with the account holder AH and may further interact with the account holder to form the templates T1, T2, T3. The account administrator AA presents the account to one of the printers P, in return for some consideration. The printer P proceeds to interact with the account holder AH to complete the process. Other divisions of labor are possible. Additionally, the account administrator AA may require all data to be stored on an administrator memory 190, which may be a separate CPU, separate storage on the administration terminal 180, a server on the Internet, and so on. The key aspect is to have the account administrator AA control data access.

It is envisioned that the account administrator AA will maintain a web site or page(s) advertising the material of the subject invention. The web site or page(s) will be configured to handle the necessary steps of the process, with all required information being passed to the printer P.

Figure 9:
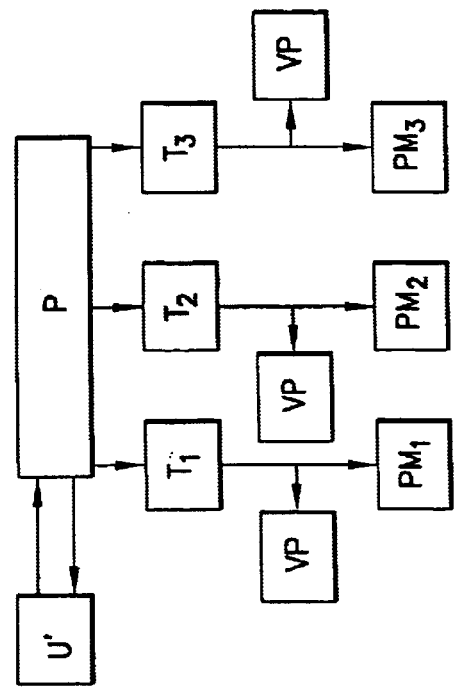
FIG. 9 is a diagram representing the second embodiment of the invention.

In a second embodiment, the user U and the account holder AH are a single entity termed herein user entity U'. With reference to the first embodiment, and variations thereof, the user entity U' interacts with the printer P, either directly or through the account administrator AA, to form the templates T1, T2, T3, as desired, and to provide order information. Here, however, as shown in FIG. 9, no input fields are required, since only the user entity U' is inputting the data, and thus no data collection template DCT is necessary. For example, the user entity U' may require a letterhead that does not require additional personal information. The templates T1, T2, T3 are used directly to produce viewable proofs VP for review by the user entity U', which preferably are generated instantaneously. Upon approval of the viewable proofs VP, which are regenerated if errors are present as above, the order is placed with a confirmatory message preferably being transmitted by the printer P to the user entity U'. The order is then fulfilled using printing plates or digital printing as also described above, and the printed matter is forwarded to the user entity U'.

Advantageously, the templates T1, T2, T3 produced by the user entity U' are stored. Thus, for a re-order, and/or informational change (e.g., change of address, change of name, change of marital status), the templates can be readily modified and new printed matter generated.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method for preparing printed matter comprising:
preparing a first template corresponding to a first type of printed matter using account holder information provided by an account holder, said first template having requirements for including a first bit of personal information and a second bit of personal information different from said first bit of personal information;
preparing a second template corresponding to a second type of printed matter, different from the first type of printed matter, using account holder information provided by the account bolder, said second template requiring said first bit of personal information;
preparing a data collection template including first and second input fields corresponding respectively to said first and second bits of personal information;
providing a user access to said data collection template;
collecting user information provided by the user in said first and second input fields;
merging the user information with the first template to form a first completed template including merging the user information provided in said first and second input fields in response to the requirements for said first and second bits of personal information;
merging the user information with the second template to form a second completed template including merging the user information provided in said first input field in response to the requirement for said first bit of personal information;
printing the first type of printed matter utilizing the first completed template; and,
printing the second type of printed matter utilizing the second completed template.

2. A method as in claim 1, further comprising the step of collecting formatting parameters from the account holder with respect to at least said first type of printed matter.

3. A method as in claim 2, wherein the user information is merged with the first template in accordance with the formatting parameters.

4. A method as in claim 1, further comprising the step of producing printing plates from the first completed template.

5. A method as in claim 4, wherein the first type of printed matter is printed using the printing plates.

6. A method as in claim 1, wherein the first type of printed matter is printed using digital printing.

7. A method as in claim 1 further comprising the step of permitting the account holder access to review the first completed template.

8. A method as in claim 1 further comprising the step of providing a first viewable proof instantaneously to the user after the step of merging the user information with the first template to form the first completed template, said first viewable proof being based on data of the first completed template.

9. A method as in claim 8, wherein the step of printing the first type of printed matter occurs upon the user approving the first viewable proof.

10. A method as in claim 9, further comprising the step of transmitting a confirmatory message to the user before the step of printing the first type of printed matter.

11. A method as in claim 1, wherein the step of printing the first type of printed matter is performed in accordance with order characteristics specified at least in part by the account holder.

12. A method as in claim 1, wherein printing the first type of printed matter is performed in accordance with order characteristics specified at least in part by the user.

* * * * *